United States Patent
Lin et al.

(10) Patent No.: US 10,626,785 B2
(45) Date of Patent: Apr. 21, 2020

(54) TWO-STAGE OIL-INJECTED SCREW AIR COMPRESSOR

(71) Applicants: ALMiG Kompressoren GmbH, Köngen (DE); FUSHENG INDUSTRIAL (SHANGHAI) CO., LTD, Shanghai (CN)

(72) Inventors: Yin-Ching Lin, New Taipei (TW); Viktor Weber, Kenzingen (DE); Sheng-Kun Chen, Shanghai (CN); Yu-Feng Wu, Taipei (TW)

(73) Assignees: ALMIG KOMPRESSOREN GMBH, Köngen (DE); FUSHENG INDUSTRIAL (SHANGHAI) CO., LTD., Shanghai (CN)

( * ) Notice: Subject to any disclaimer, the term of this patent is extended or adjusted under 35 U.S.C. 154(b) by 224 days.

(21) Appl. No.: 15/630,965

(22) Filed: Jun. 23, 2017

(65) Prior Publication Data
US 2018/0119601 A1    May 3, 2018

(30) Foreign Application Priority Data
Oct. 28, 2016    (EP) .................................. 16196261

(51) Int. Cl.
| F04C 23/00 | (2006.01) |
| F04C 18/16 | (2006.01) |
| F04C 29/00 | (2006.01) |
| F04C 29/04 | (2006.01) |
| F04C 28/26 | (2006.01) |
| F02B 23/04 | (2006.01) |

(Continued)

(52) U.S. Cl.
CPC ............. F02B 23/04 (2013.01); F01M 3/02 (2013.01); F04C 18/16 (2013.01); F04C 23/001 (2013.01); F04C 28/265 (2013.01); F04C 29/005 (2013.01); F04C 29/042 (2013.01); F02B 13/08 (2013.01); F04C 29/0014 (2013.01); F04C 2210/1005 (2013.01); F04C 2240/30 (2013.01); Y02T 10/125 (2013.01)

(58) Field of Classification Search
CPC . F02B 23/04; F02B 13/08; F01M 3/02; F04C 18/16; F04C 23/001; F04C 28/265; F04C 29/042; F04C 29/0014; F04C 2210/1005; F04C 2240/30; F04C 2/14; F04C 2/16; F04C 2/18; F04C 29/002; F04C 29/02; F04C 29/024; F04C 29/0007; F04C 2210/22; F04C 2210/221
See application file for complete search history.

(56) References Cited

U.S. PATENT DOCUMENTS

| 2003/0223897 A1* | 12/2003 | Ferentinos | .............. F04C 18/16 418/9 |
| 2010/0209259 A1* | 8/2010 | Kawamura | .......... C23C 16/4412 417/12 |

FOREIGN PATENT DOCUMENTS

| CN | 203175868 U | 9/2013 |
| CN | 204877948 U | 12/2015 |
| CN | 205401139 U | 7/2016 |

* cited by examiner

*Primary Examiner* — Philip E Stimpert
(74) *Attorney, Agent, or Firm* — CKC & Partners Co., LLC

(57) ABSTRACT

A two-stage oil-injected screw air compressor includes an integrated compression casing, and the integrated compression casing further includes a first stage compression chamber, an intermediate cooling channel, and a second stage compression chamber parallel stacked in the integrated compression casing. A straightforward oil injector aims at the intermediate cooling channel to spray lubricating oil into the intermediate cooling channel.

8 Claims, 1 Drawing Sheet

(51) Int. Cl.
*F01M 3/02* (2006.01)
*F02B 13/08* (2006.01)

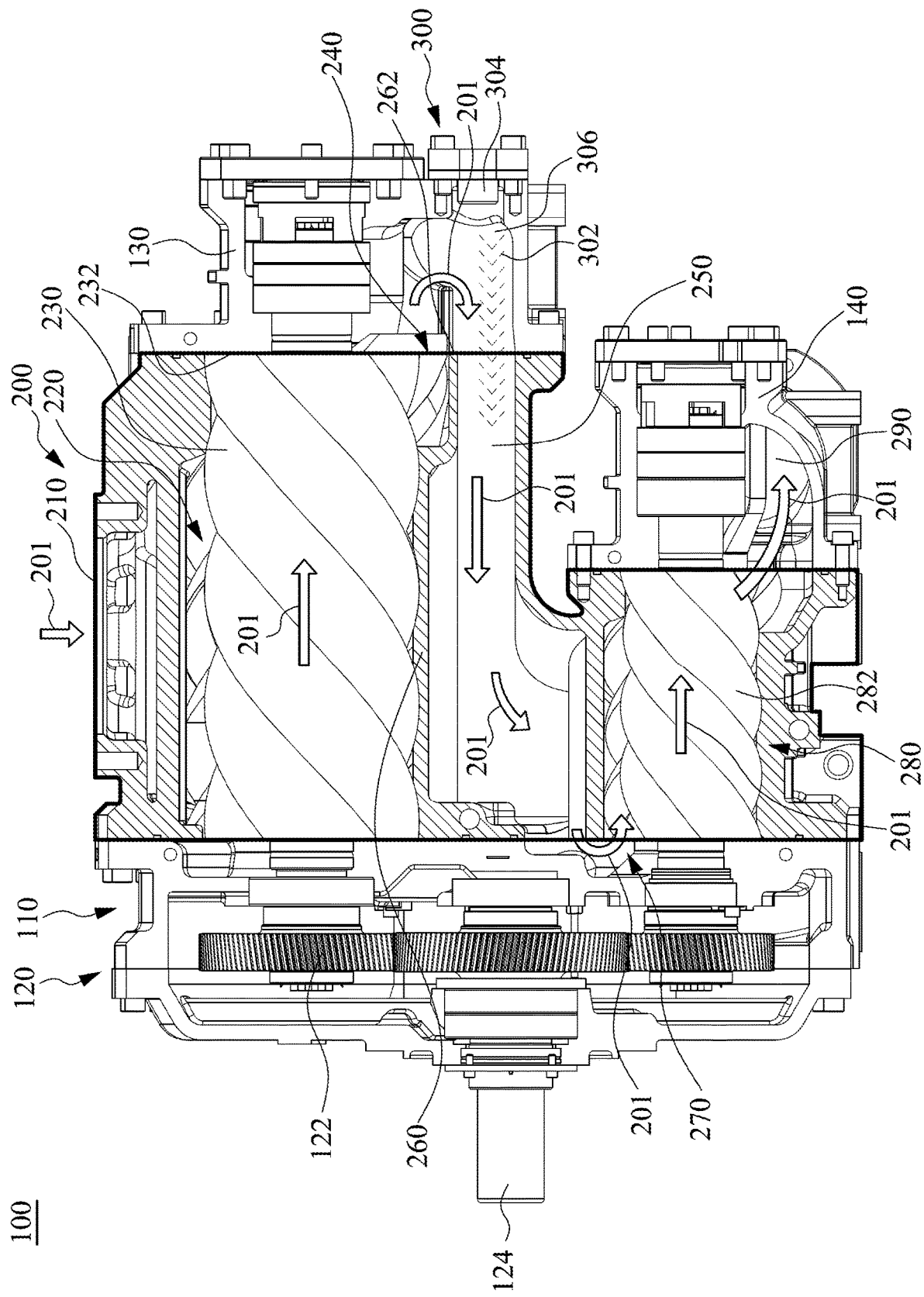

TWO-STAGE OIL-INJECTED SCREW AIR COMPRESSOR

RELATED APPLICATIONS

This application claims priority to European Patent Application No. 16196261.8, filed Oct. 28, 2016, which is herein incorporated by reference.

TECHNICAL FIELD

The present disclosure generally relates to a screw air compressor. More particularly, the present disclosure relates to a two-stage oil-injected screw air compressor.

BACKGROUND

Screw air compressors have been widely used to provide compressed air in industry. The screw air compressor includes two rotors mounted in a working room. Each rotor is provided with helically extending lobes and grooves which are intermeshed to establish compression cavities. In these cavities, a gaseous fluid is displaced and compressed from an inlet channel to an outlet channel by way of the screw compressor.

Each compression cavity during a filling phase communicates with the inlet, during a compression phase undergoes a continued reduction in volume, and during a discharge phase communicates with an outlet. Screw air compressors are often provided with valves for regulating the built-in volume ratio for the capacity of the compressor.

Two-stage oil-injected screw air compressor can provide high pressure for the heavy-duty equipment. However, the efficiency of the screw air compressors plays an important role in the energy consumed at the entire factory. For the effective use of the screw air compressors to reduce the energy consumption, there is a need to provide a more efficient, safe, and reliable two-stage oil-injected screw air compressor.

SUMMARY

One objective of the embodiments of the present invention is to provide a two-stage oil-injected screw air compressor having a straightforward oil injector to spray the lubricating oil into the intermediate cooling channel so as to increase the cooling efficiency of the two-stage oil-injected screw air compressor.

To achieve these and other advantages and in accordance with the objective of the embodiments of the present invention, as the embodiment broadly describes herein, the embodiments of the present invention provides a two-stage oil-injected screw air compressor having an integrated compression casing, and the integrated compression casing further includes a first stage compression chamber, an intermediate cooling channel, and a second stage compression chamber parallel stacked in the integrated compression casing. In addition, a straightforward oil injector aims at the intermediate cooling channel to spray lubricating oil into the intermediate cooling channel and parallel with the intermediate cooling channel.

The first stage compression chamber further includes first stage screw rotors disposed therein, and the second stage compression chamber further includes second stage screw rotors disposed therein.

In one embodiment, the integrated compression casing further includes an intermediate baffle disposed between the first stage compression chamber and the intermediate cooling channel, and a rotor end portion of the first stage screw rotors aligns a baffle end portion of the intermediate baffle.

In one embodiment, the first stage compression chamber further includes a mixed flow air outlet, and the second stage compression chamber further includes a mixed flow air inlet.

In one embodiment, the two-stage oil-injected screw air compressor further includes an oil injecting module having an oil injecting chamber, and the oil injecting chamber guides the first stage compressed air entering into the intermediate cooling channel.

In one embodiment, the two-stage oil-injected screw air compressor further includes a front bearing seat fixed at one end of the first stage compression chamber and the second stage compression chamber, and a first stage rear bearing seat fixed at another end of the first stage compression chamber and a second stage rear bearing seat fixed at another end of the second stage compression chamber.

In one embodiment, the two-stage oil-injected screw air compressor further includes a gear box on the front bearing seat, and the gear box includes a speed change gear set and a drive shaft coupled to the speed change gear set.

The two-stage oil-injected screw air compressor according to one embodiment of the present invention utilizes the straightforward oil injector to directly inject the lubricating oil into the intermediate cooling channel and parallel to the first stage compressed air flowing in the intermediate cooling channel so that the cooling efficiency of the lubricating oil and the two-stage oil-injected screw air compressor is effectively increased.

Furthermore, the baffle end portion is extended to the end edge of the first stage screw rotors to effectively increase the compression efficiency of the first stage compression chamber to further increased the whole efficiency of the two-stage oil-injected screw air compressor.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein:

FIG. 1 illustrates a schismatic diagram showing a two-stage oil-injected screw air compressor according to one embodiment of the present invention.

DETAILED DESCRIPTION OF THE PREFERRED EMBODIMENT

The following description is of the best presently contemplated mode of carrying out the present disclosure. This description is not to be taken in a limiting sense but is made merely for the purpose of describing the general principles of the invention. The scope of the invention should be determined by referencing the appended claims.

Referring to FIG. 1, a schismatic diagram showing a two-stage oil-injected screw air compressor according to one embodiment of the present invention is illustrated. The two-stage oil-injected screw air compressor 100 includes an integrated compression casing 200, a front bearing seat 110 fixed at one end of the integrated compression casing 200, a first stage rear bearing seat 130 and a second stage rear bearing seat 140 fixed at another end of the integrated compression casing 200.

The integrated compression casing 200 further includes a first stage compression chamber 220, an intermediate cooling channel 250, and a second stage compression chamber 280, and all of them are formed in the integrated compression casing 200 and stacked in parallel. The arrows 201 denote the air flow direction, and the dashed line arrows denote the injecting oil 302.

The first stage compression chamber 220 further includes first stage screw rotors 230 disposed therein to compress air absorbed from an air inlet 210 into a first stage compressed air, and the first stage compressed air is discharged from a first stage air outlet 240 into the intermediate cooling channel 250. The second stage compression chamber 280 further includes second stage screw rotors 282 disposed therein to further compress the first stage compressed air into a second stage compressed air, having a higher pressure than that of the first stage compressed air. The first stage compressed air is absorbed from the intermediate cooling channel 250 through a second stage air inlet 270 into the second stage compression chamber 280, and further compressed in the second stage compression chamber 280 to form the second stage compressed air and discharge from a second stage air outlet 290.

Furthermore, a gear box 120 is fixed on the front bearing seat 110, and the gear box 120 includes a speed change gear set 122 and a drive shaft 124 coupled to the speed change gear set 122. The drive shaft transmits a power generated by a motor into the speed change gear set 122 to distribute the power into the first stage screw rotors 230 and the second stage screw rotors 282.

A straightforward oil injector 304 aims at the intermediate cooling channel 250 to spray the injecting oil 302, i.e. the lubricating oil, into the intermediate cooling channel 250 and injecting oil 302 is parallel with the intermediate cooling channel 250. Therefore, the cooling efficiency of the two-stage oil-injected screw air compressor 100 is effectively increased.

In addition, the straightforward oil injector 304 can directly mounted on the integrated compression casing 200 to spray the injecting oil 302 into the intermediate cooling channel 250. Alternatively, the two-stage oil-injected screw air compressor 100 can further includes an oil injecting module 300, and the straightforward oil injector 304 is fixed on the oil injecting module 300. The oil injecting module 300 further includes an oil injecting chamber 306 able to guide the first stage compressed air entering into the intermediate cooling channel 250 and the straightforward oil injector 304 sprays the injecting oil 302 parallel with the first stage compressed air while the first stage compressed air entering into the intermediate cooling channel 250.

It is worth noting that the integrated compression casing 200 further includes an intermediate baffle 260 disposed between the first stage compression chamber 220 and the intermediate cooling channel 250, and a rotor end portion 232 of the first stage screw rotors 230 aligns a baffle end portion 262 of the intermediate baffle 260. That is to say, the rotor end portion 232 of the first stage screw rotors 230 is extended to an end edge of the baffle end portion 262 of the intermediate baffle 260.

In one embodiment, the first stage air outlet 240 is a mixed flow air outlet, and the second stage air inlet 270 is a mixed flow air inlet.

In one embodiment, the front bearing seat 110 fixed at one end of the first stage compression chamber 220 and the second stage compression chamber 280, and the first stage rear bearing seat 130 is fixed at another end of the first stage compression chamber 220 and a second stage rear bearing seat 140 is fixed at another end of the second stage compression chamber 280.

The two-stage oil-injected screw air compressor according to one embodiment of the present invention utilizes the straightforward oil injector to directly inject the lubricating oil into the intermediate cooling channel and parallel to the first stage compressed air flowing in the intermediate cooling channel so that the cooling efficiency of the lubricating oil and the two-stage oil-injected screw air compressor is effectively increased.

In addition, the baffle end portion is extended to the end edge of the first stage screw rotors to effectively increase the compression efficiency of the first stage compression chamber to further increased the whole efficiency of the two-stage oil-injected screw air compressor. Therefore, the two-stage oil-injected screw air compressor can be operated more efficient.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A two-stage oil-injected screw air compressor, comprising:
   an integrated compression casing, wherein the integrated compression casing further comprises:
   a first stage compression chamber;
   an intermediate cooling channel; and
   a second stage compression chamber, wherein the first stage compression chamber, the intermediate cooling channel and the second stage compression chamber extend in respective longitudinal directions that are mutually parallel in the integrated compression casing, wherein the intermediate coating channel is located between the first stage compression chamber and the second stage compression chamber; and
   an oil injector aiming at the intermediate cooling channel to spray lubricating oil along a downstream direction of an air flow in the intermediate cooling channel into the intermediate cooling channel and parallel with the intermediate cooling channel, wherein the first stage compression chamber further comprises first stage screw rotors disposed therein and the second stage compression chamber further comprises second stage screw rotors disposed therein, wherein a length of the intermediate cooling channel along an air flow direction of the first stage compression chamber is greater than a length of each of the second stage screw rotors in the second stage compression chamber along the air flow direction of the first stage compression chamber.

2. The two-stage oil-injected screw air compressor of claim 1, wherein the integrated compression casing further comprises an intermediate baffle disposed between the first stage compression chamber and the intermediate cooling channel, and a rotor end portion of the first stage screw rotors aligns with a baffle end portion of the intermediate baffle.

3. The two-stage oil-injected screw air compressor of claim 1, wherein the first stage compression chamber further comprises a mixed flow air outlet.

4. The two-stage oil-injected screw air compressor of claim 3, wherein the second stage compression chamber further comprises a mixed flow air inlet.

5. The two-stage oil-injected screw air compressor of claim 1, further comprising an oil injecting module, wherein the oil injector is fixed on the oil injecting module and the oil injecting module further comprises an oil injecting chamber to guide air compressed in the first stage compression chamber entering into the intermediate cooling channel.

6. The two-stage oil-injected screw air compressor of claim 1, further comprising a front bearing seat fixed at one end of the first stage compression chamber and the second stage compression chamber, and a first stage rear bearing seat fixed at another end of the first stage compression chamber and a second stage rear bearing seat fixed at another end of the second stage compression chamber.

7. The two-stage oil-injected screw air compressor of claim 6, further comprising a gear box on the front bearing seat.

8. The two-stage oil-injected screw air compressor of claim 7, wherein the gear box comprises a speed change gear set and a drive shaft coupled to the speed change gear set.

* * * * *